UNITED STATES PATENT OFFICE.

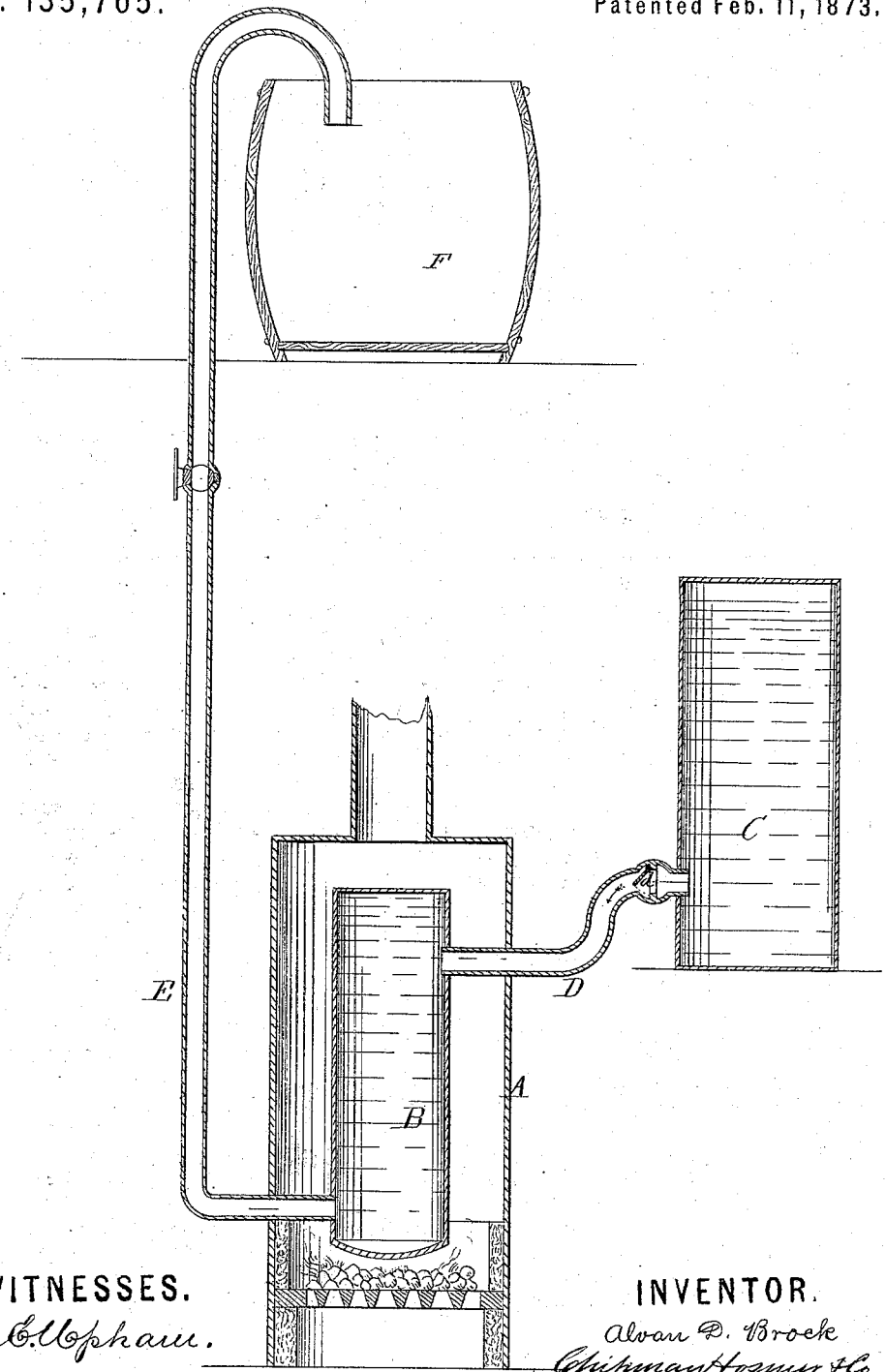

ALVAN D. BROCK, OF WASHINGTON, DISTRICT OF COLUMBIA.

IMPROVEMENT IN STEAM WATER-ELEVATORS.

Specification forming part of Letters Patent No. 135,765, dated February 11, 1873.

*To all whom it may concern:*

Be it known that I, ALVAN D. BROCK, a citizen of Washington, in the county of Washington and District of Columbia, have invented a new and valuable Improvement in Automatic Water-Elevators; and I do hereby declare that the following is a full, clear, and exact description of the construction and operation of the same, reference being had to the annexed drawing making a part of this specification, and to the letters and figures of reference marked thereon.

Figure 1 of the drawing is a representation of a vertical section of my invention.

This invention has relation to automatic water-elevators; and it consists in the construction and novel arrangement of an apparatus in which the expansive power of water, when heated, and the pressure of steam generated by such heat, are utilized in elevating the water to any desired height for use in dwellings, hotels, laundries, bath-rooms, &c., substantially as hereinafter described.

My invention, it is believed, involves a principle which has heretofore never been applied in the elevating of water; hence I do not wish to be limited to any particular form or unimportant arrangement of mechanical devices where others would answer the same purpose.

In order, however, that the nature of my invention may be clearly understood, I will describe in detail an apparatus which is illustrated in the accompanying drawing, and which shows a proper construction and disposition of parts for the application of my invention.

In the drawing, A represents a furnace; B, a water-heater placed in an upright position therein; C, a water-reservoir, located apart from the furnace, and properly on an elevation. D is a conduit-pipe leading from the lower part of said reservoir to the upper part of the heater. d represents a check-valve, which opens toward the heater. E is a discharge-pipe leading from the lower part of the heater to any desirable height. F is a tank, representing a receptacle for the water when elevated.

*Operation.*

Fire is kindled in the furnace and the heater filled from the reservoir, the water passing freely through the check-valve d. As the water becomes heated it expands and rises gradually in the pipe E. When the water becomes heated to the boiling point the generated steam rises to the top of the heater and begins to displace the water, which passes up the pipe E, and finally escapes from said pipe. At length all the water in the heater above the lower orifice of the pipe E having been expelled, the steam rushes in and drives all the water from the pipe. While the water is being expelled from the heater the steam-pressure closes the valve d. As soon, however, as the steam is allowed to escape through the discharge-pipe, the pressure in the heater is relieved, and the check-valve allowed to open and the water to again fill the heater. The operation of elevating the water then again proceeds as before.

I have found by actual test that where steam of low tension only is required the reservoir C, conduit-pipe D, and check-valve d will operate as a constant and regular feeder of the steam-boiler, provided the water in A is kept at or a little above the desired water-level in the boiler; and, of course, any desired pressure can be maintained upon the boiler by elevating the reservoir to such a height that the pressure of water therein will always counterbalance the steam-pressure required.

What I claim as my invention, and desire to secure by Letters Patent, is—

The combination, with a reservoir, C, and boiler B, of a supply-pipe, D, having an automatic check-valve, d, and a discharge-pipe, E, having its exit from the boiler below the water-line, all arranged substantially as and for the purpose specified.

In testimony that I claim the above I have hereunto subscribed my name in the presence of two witnesses.

ALVAN D. BROCK.

Witnesses:
  GEO. E. UPHAM,
  D. D. KANE.